Dec. 15, 1964    K. KÄSSBOHRER    3,161,172
SIX DRIVEN WHEEL VEHICLE WITH FRONT AND REAR WHEELS
ARTICULATED ABOUT A TRANSVERSE AXIS
Filed May 17, 1960    11 Sheets-Sheet 1

INVENTOR.
KARL KÄSSBOHRER
BY

Dec. 15, 1964 K. KÄSSBOHRER 3,161,172
SIX DRIVEN WHEEL VEHICLE WITH FRONT AND REAR WHEELS
ARTICULATED ABOUT A TRANSVERSE AXIS
Filed May 17, 1960 11 Sheets-Sheet 2

INVENTOR.
KARL KÄSSBOHRER
BY

INVENTOR.
KARL KÄSSBOHRER
BY

United States Patent Office 3,161,172
Patented Dec. 15, 1964

3,161,172
SIX DRIVEN WHEEL VEHICLE WITH FRONT AND REAR WHEELS ARTICULATED ABOUT A TRANSVERSE AXIS
Karl Kässbohrer, Ulm (Danube), Germany, assignor to Firma Karl Kässbohrer Fahrzeugwerke G.m.b.H., Ulm (Danube), Germany
Filed May 17, 1960, Ser. No. 29,705
Claims priority, application Germany, June 6, 1959, K 37,929; Mar. 11, 1960, K 40,141
6 Claims. (Cl. 115—1)

This invention relates to multiple axle vehicles and, more particularly, to such a vehicle provided with a central carrying or load axle associated with a differential, the vehicle having two pairs of arms, one directed forwardly and the other directed rearwardly, which are oscillatably mounted on the central axle and which have free ends carrying the front and rear wheels, with the arms enclosing chain drives for these wheels.

Vehicles of this type are adaptable not only for operation over roads, but also for operation across country over uneven terrain. Because of the great flexibility of such a vehicle, for permitting running over uneven terrain, very great difficulties have been encountered in designing the body and the steering gear in such a manner that the cross country performance of the vehicle is not impaired.

The present invention avoids these difficulties by providing the two oscillating arms mounted on a respective side of the vehicle to be carried by a single bearing body arranged on the central carrying or load axle, for oscillation relative to each other. Also, the pair of arms directed toward the rear of the vehicle, as well as the pair directed toward the front of the vehicle, each carry one vehicle chassis, with each chassis being supported at its inner end of the central carrying or load axle and at its outer end, by spring means, on the associated pair of oscillating arms. A steering device is provided on the front vehicle chassis, and includes a connecting rod connected to a transmission lever supported in the neighborhood of the differential. This transmission lever is connected by tie rods with the dirigible vehicle wheels.

With the arrangement of the present invention, the vehicle body elements can be carried separately on the load axle so that the mobility of the vehicle wheels is fully maintained. Due to the particular design of the steering gear, the flexibility of the vehicle is not impaired even though full steering control is maintained at all times.

A further important feature resides in the arrangement of the bearing bodies, each of which serves as a bearing for the two arms on a respective side of a vehicle. For this purpose, each bearing body is arranged as a chain wheel casing, having a circular-cylindrical wall which is provided with apertures for passage of the chain runs. The inner ends of the pair of oscillating arms on each respective vehicle side face each other, and are provided with circular-cylindrical bearing heads or surfaces engaging the bearing body or chain wheel casing. These bearing heads are preferably arranged in the shape of arcuate cylindrical bearing bushings conforming to the curvature of the chain wheel housing, and which are retained in position on the housing by angle cross section retaining rings each having a flange fitting over a bearing bushing and having bearing play therewith. Alternatively, the bearing heads can be arranged as annular, completely cylindrical heads surrounding the respective chain wheel casing, and each of which has an axial dimension which is only one half the axial dimension of the associated chain wheel casing. These completely annular bearing heads may also be retained on the associated chain wheel casing by flanged rings having bearing play with the bearing heads.

By arranging the pair of oscillating arms on a respective side of the vehicle on a single bearing body, it is possible to provide, adjacent the differential of the central load axle, sufficient space so that one of the two vehicle frames is supported fixedly on the central axle and the other oscillatably mounted thereon. Preferably, that frame connected fixedly with the central axle serves to support a driving engine which is connected by a gear mechanism, a clutch and an articulated shaft, with the differential of the central axle. With this arrangement, the spring devices for supporting the vehicle frames on the associated pairs of oscillating arms can be arranged as leaf-spring assemblies extending transversely to the direction of drive. These assemblies have their center portions pivotally mounted on the vehicle frames, in the manner of a balance beam, and with the extremities of each assembly bearing on the associated oscillating arms. To eliminate torsion stresses on the oscillating arms, resulting from the floating suspension of the front and rear wheels, guides having a vertically extending U-profile may be arranged on each vehicle frame. A vertically extending gib, arranged on the extremity of each oscillating arm, is positively guided between the legs of these U-profiles for vertically slidable movement relative thereto.

That vehicle frame carrying the drive engine can be provided with a seat, and the other frame with a transport container. In such an arrangement, the seat and the adjacent front wall of the transporting container are arranged in spaced relation to each other. Preferably, the oscillating arms on each side of the vehicle are interconnected by means of a hydraulic actuator device so that one or the other of the vehicle frames can be lifted. This hydraulic actuator can be double acting so that the central axle also can be lifted.

A particularly simple construction of the steering mechanism fulfilling all of the necessary requirements is obtained if the transmission lever is arranged as a two-arm steering yoke pivoted intermediate its ends for pivotal movement in a horizontal plane. Tie rods connect the end of this yoke to the steering arms of the dirigible wheels, and a tie rod connected with the steering device is articulated to one arm of the steering yoke. The steering device may be arranged as a steering bar gear mechanism. By the use of this arrangement, it is possible further to use dirigible rear wheels on the vehicle. In such an arrangement, a further steering yoke is mounted in the same manner as described, and each yoke has a horizontal arm secured to extend therefrom longitudinally of the vehicle. These arms are interconnected at their ends by a vertical articulation device whereby at least one of the two associated arms is adjustable in length and flexible, as by being in the form of roller-type chain links.

For an understanding of the principles of the invention, reference is made to the following description of typical embodiments thereof as illustrated in the accompanying drawings.

Figure 1:
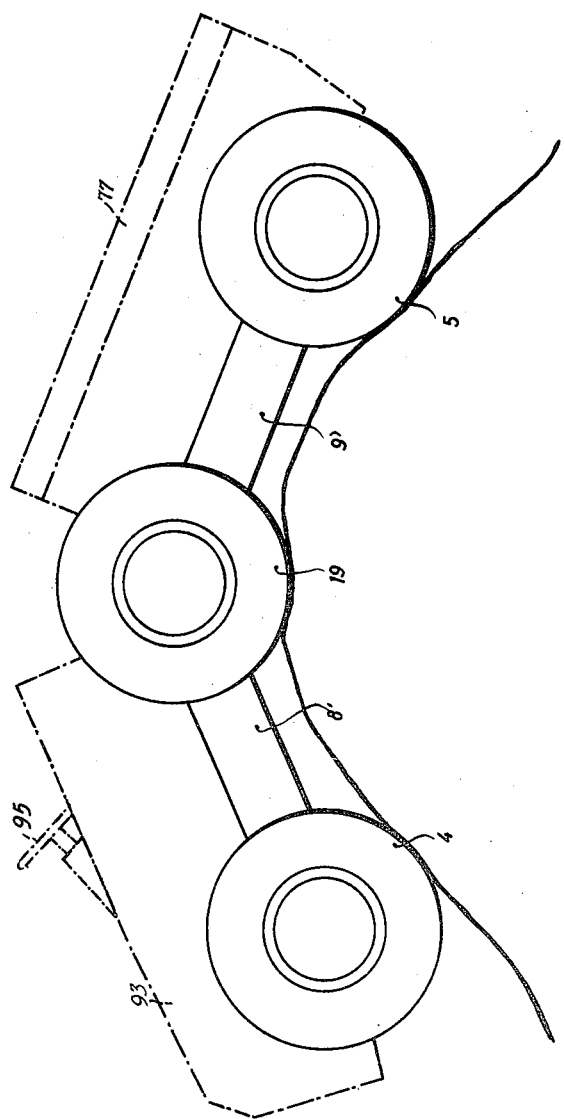
FIG. 1 is a side elevation view of a vehicle embodying the invention, illustrated as operating over uneven terrain and with the body elements being indicated in dot and dash-lines.
Figure 2:
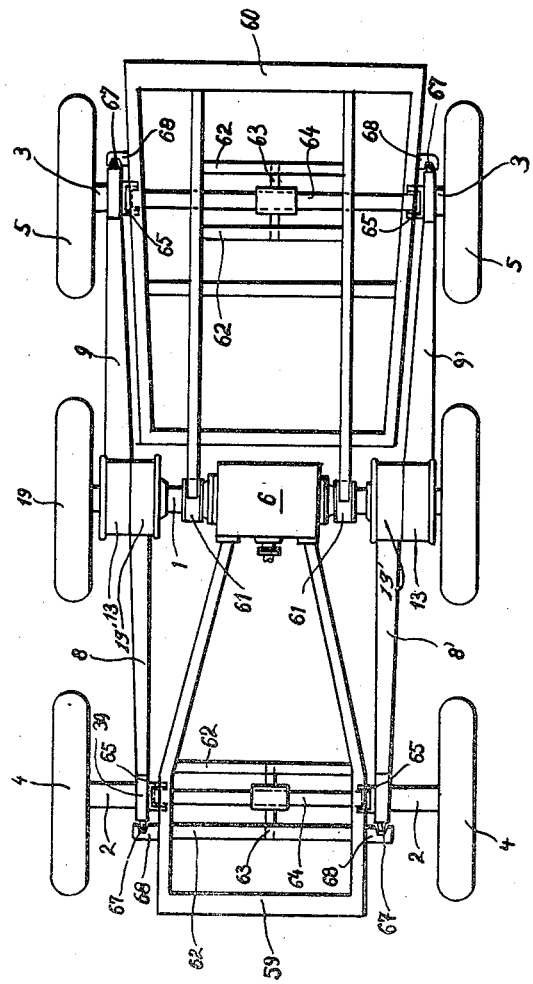
FIG. 2 is a top plan-view of the vehicle shown in FIG. 1 with the body elements removed.
Figure 3:
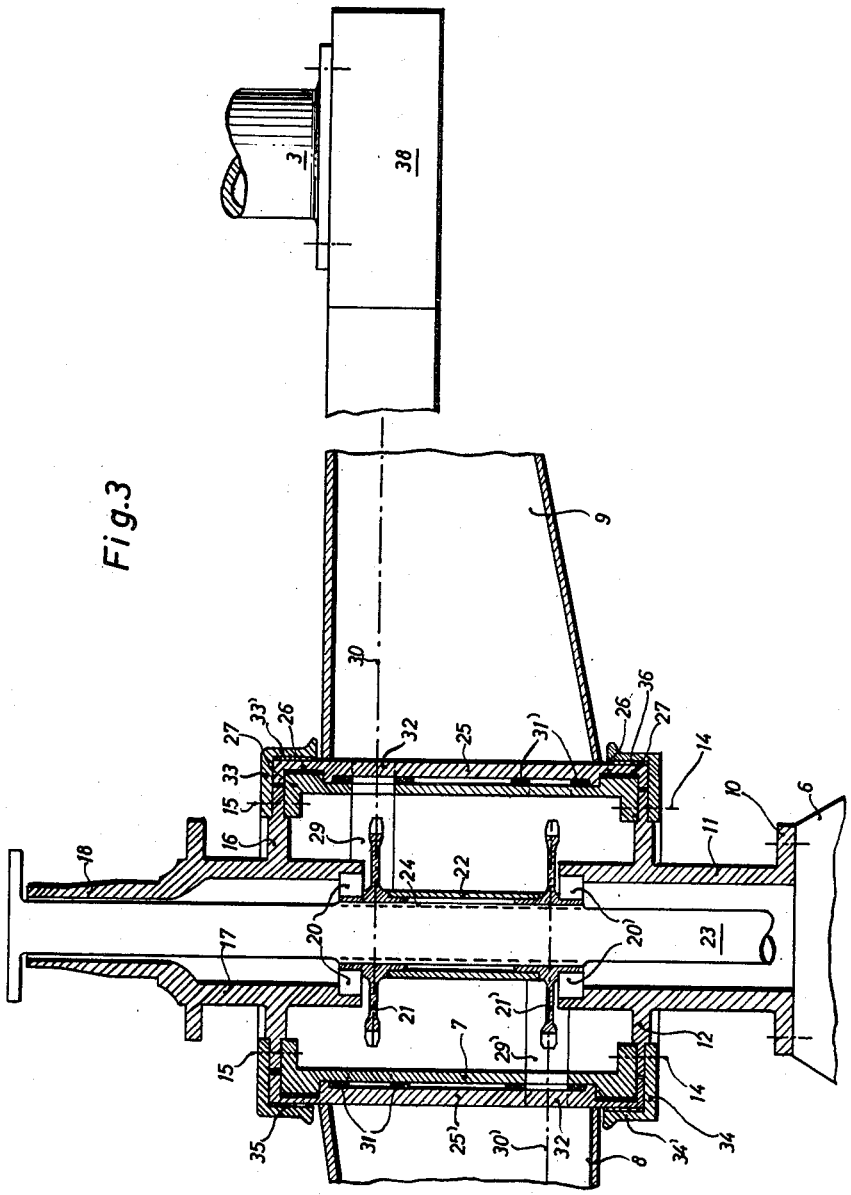
FIG. 3 is a horizontal axial sectional view through a chain wheel casting, illustrating one embodiment of the arrangement for mounting the articulated arms.
Figure 5:
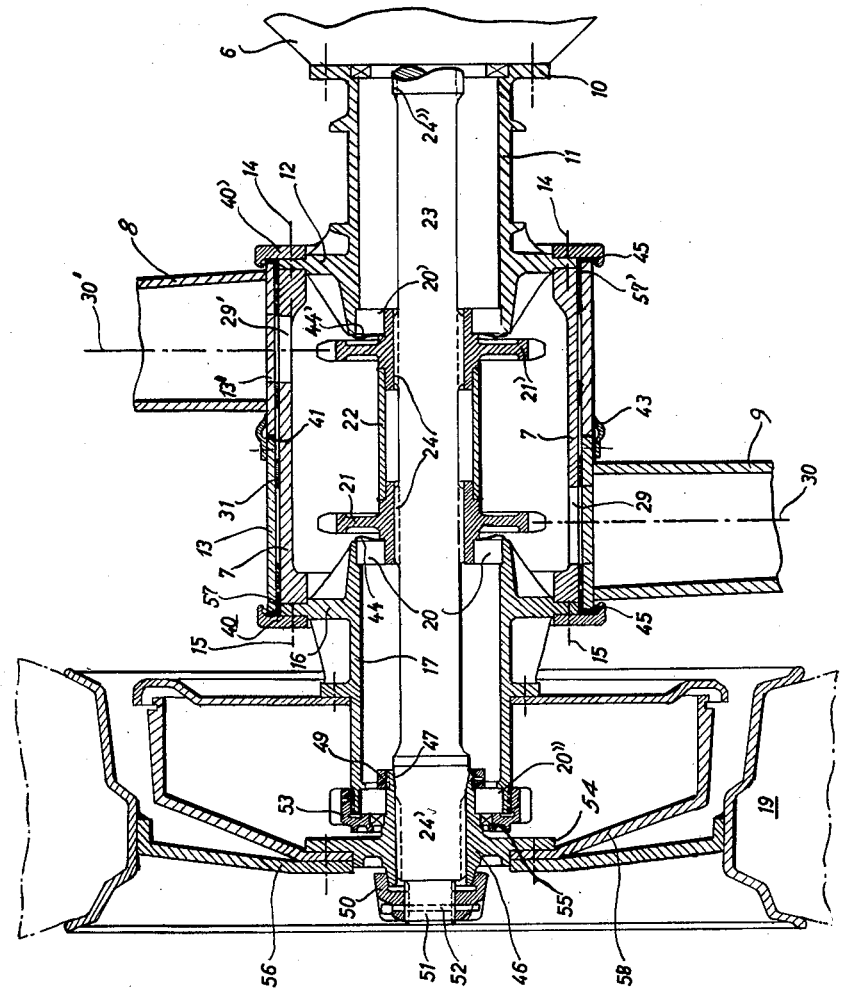
FIG. 5 is a view similar to FIG. 3 and illustrating another embodiment of the mounting of the oscillating arms.
Figure 6:
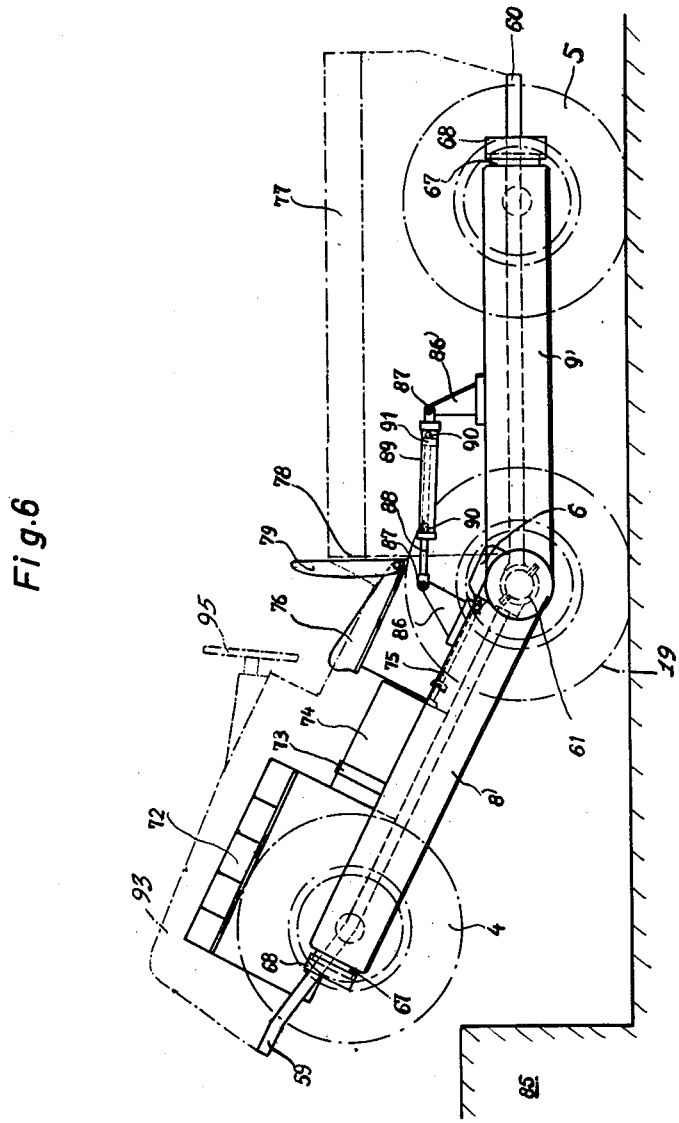
FIG. 6 is a side elevation view of the vehicle illustrated in the condition for passing a dragon tooth barrage or barrier, the body elements of the vehicle being shown in dot and dash-lines.

As best seen in FIG. 2, the chassis of a vehicle embodying the invention has a central through or continuous axle 1, with the front and rear axles being in the form of stub shafts or axles 2 and 3, respectively, on which the front and rear wheels 4 and 5, respectively, are mounted in a floating manner. The through axle 1 is provided with a differential 6, which is connected, through gearing and a clutch, with a driving engine 72 located in the front body portion of the vehicle, as best seen in FIG. 6. Adjacent each end of the central axle 1, there is a chain wheel housing 7, such as shown in FIGS. 3 and 5. On each housing 7 there is mounted a pair of oscillatable arms 8 and 9 or 8' and 9', respectively. The free ends of these oscillating arms support the stub shafts or axles 2 and 3. As best seen in FIG. 1, the vehicle body elements are sub-divided into two parts each of which is supported by a pair of front oscillating arms 8, 8' or a pair of rear oscillating arms 9, 9'.

Figure 4:
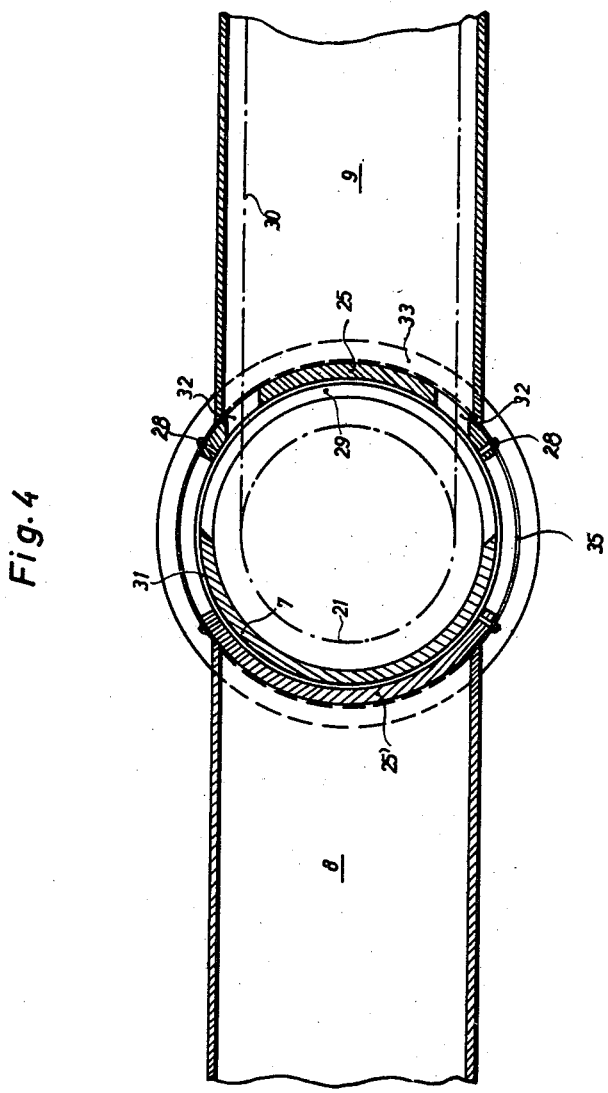
FIG. 4 is a diametric sectional view through the chain wheel housing taken in the plane of the outer chain wheel.

Referring to FIGS. 3 and 4, tubular axle elements 11 are secured to opposite sides of differential 6 by means of bolts extending through flanges 10 on the elements 11. Each element 11, nearer its outer extremity, is formed with a flange 12 to which a chain wheel casing 7 is fixed by means of screws 14 shown merely by center lines. The opposite or outer end of chain wheel housing 7 is secured to the flange 16 of an outer tubular axle element 17 by screws 15, shown merely by center lines. The outer end of axle element 17 is arranged in the form of a stub shaft or stub axle 18 for rotatably supporting a center vehicle wheel 19 (FIG. 1).

The ends of the elements 11 and 17 extend into chain wheel housing 7 in coaxial relation therewith, and these inwardly extending ends support anti-friction bearings 20 and 20', respectively. The anti-friction bearings 20, 20' support respective chain gear wheels 21 and 21' interconnected by a tubular sleeve 22 which also maintains the chain gear wheels in fixed axially spaced relation. Each chain wheel is connected, by a chain 30, respectively, to a similar sprocket (not shown) in a housing, such as 38, at the end of the respective oscillating arm. Drive shafts, such as 23, project axially from opposite ends of differential 6, and extend through a chain wheel housing 7 in a single piece to the exterior of the vehicle. Drive shaft 23 has a flange on its outer end which may be secured in driving relation with a wheel rotatably mounted upon stub axle 18. In the neighborhood of sprockets 21 and 21', drive shaft 23 is provided with a key way 24, engaged with key on sprockets 21 and 21', so that the latter are secured to rotate with drive shaft 23.

Bushings 25, 25' are journaled on the exterior of the drive shaft housing and are unitary with the associated oscillating arms 9 and 8, respectively. These bushings have channel grooves 26 which seat correspondingly shaped collars or ribs of flanges 27 of the chain wheel housing to prevent relative axial displacement of the bushings and the chain wheel housings. An intervening radial space may be filled with a bearing coating.

Chain wheel housing 7 is formed with apertures 29, 29' each in the diametric plane of a respective sprocket 21 or 21', respectively, for passage of the runs of the associated driving chains 30, 30', respectively. These driving chains are illustrated solely by center lines. Adjacent apertures 29, 29', sealing rings 31, 31', respectively, are arranged on the outer periphery of housing 7. As can be seen in FIG. 4, each bearing bushing 25, 25' is formed with slots 32 through which the runs of the associated chain 30 or 30' extend. Bearing bushings 25 and 25' are secured oscillatably on housing 7 by angle cross section rings having flanges 33, 34 secured by screws 15 and 14, respectively, to flange 16 of tubular member 17 and flange 12 of tubular member 11. Each ring includes a respective flange 33' and 34' which extends over the rim of a bearing bushing 25 or 25'. Between flanges 33' and 34' and the rims of the bearing bushings 25 and 25', linings 35, 36 are arranged.

Sealing rings 31, 31' are connected with bearing bushings 25, 25', respectively, by means of screws 28 (FIG. 4). In FIG. 4, these screws are shown in the plane of the section for a better understanding, in spite of the fact that, as a practical matter, they are not arranged in the section plane. One sealing ring 31 is connected with one bearing bushing, and the other bearing sealing ring is connected with the other bearing bushing.

In order to provide for a sufficient range of relative movement of oscillating arms 8 and 9, bearing bushings 25 and 25' do not extend through 180°, but have a smaller arcuate extent, so that they do not interfere with each other in the case of the simultaneous oscillation of arms 8 and 9.

As has been seen in FIGS. 2 and 3, arms 8 and 9 taper toward their free ends, and each free end has a respective chain wheel housing 38 or 39 provided thereon. The respective stub shafts 3 or 2, respectively, have flanges connected by bolts to these housings 38 and 39. Each stub shaft 2 and 3 is designed similarly to the tube elements 17, so that short drive shafts (not shown) can be arranged in the stub shafts for driving the front and rear wheels.

As best seen in FIG. 3, sprockets 21 and 21' are similar to each other. Also, the sprockets in the housings 38 and 39 are similar to each other so that all of these sprockets may be interchanged and mounted in place of each other in the same bearing relation and with the same driving relation. Furthermore, rings 33 and 34 for anchoring the bearing bushings 25 and 25' in position can be interchanged without difficulty, as these rings are similar to each other.

In addition, arms 8 and 9 with their associated bearing bushings 25, 25' are completely similar in their configuration, so that they also can be interchanged. The only two elements which differ are the stub shafts for the front and rear wheels, as stub shafts 2 for the front wheels are longer than stub shafts 3 for the rear wheels.

The embodiment of the drive mechanism shown in FIG. 5 corresponds to the arrangement shown in FIG. 3 insofar as respects the hollow center axle 1 including differential housing 6, chain wheel housing 7, and tubular elements 17 and 11. There is also provided a continuous driving axle 23, as in FIG. 3, and which is keyed to sprockets 21 and 21' rotatably supported in bearings 20 and 20'.

However, in the embodiment of FIG. 5, the bearing heads on the inner ends of the oscillatable arms 8 and 9 are in the form of completely annular bearing rings 13 and 13' each surrounding a chain wheel housing 7 and each having an axial extent equal to one half the axial extent of the associated chain wheel housing. These bearing rings 13 and 13' are restricted axially, with some bearing play, by means of angular cross section rings 40 and 40' which, in turn, are secured by screws 14 and 15 against axial movement relative to housing 7. A bearing ring 41 of suitable material can be arranged between the inner ends of bearing rings 13 and 13', to assure easy relative movement of the inner ends of the bearing rings. The joint having the slide bearing ring 41, which may be made of plastic material, can be sealed in a suitable manner by providing a sealing ring on bearing ring 13, adjacent joint 41, and having an extension 43 acting as a sealing extension bearing resiliently on the circumference of the other bearing ring 13'.

To provide bearing support for rings 13 and 13' in both the radial and the axial direction, correspondingly arranged bearings 57 and 57' may be provided. In addition, each flange ring 40 or 40' carries, in an annular groove, a sealing ring 45 which may be, for example, in the shape of an endless rubber cord forming an external seal for the bearings 57 and 57'.

The outer end of shaft 23 is formed, in the embodiment of FIG. 5, with a key way 24', or other suitable driving formation engageable with a corresponding mating driving formation in the bore of wheel hub 46. Axle or shaft 23 is fixed against axial displacement relative to hub 46. For this purpose, the outer portion of shaft 23 has a conical surface 47 extending into a conical portion of the bore of hub 46. The inner end of hub 46 is threaded to receive a compression ring 49, and the outer end of hub 46 is formed as a conical surface which is an engagement with a tensioning nut 50 having a conical bore. Nut 50 is threaded on a threaded portion 51 of shaft 23, and is thus designed as a camming nut which is secured against rotation, when once adjusted, by suitable means such as a cotter pin 52. By the described arrangement, not only is hub 46 maintained against axial displacement relative to shaft 23, but it is also clamped tightly radially thereagainst.

A feature of the arrangement of FIG. 5 is that wheel hub 46 is journalled in a floating manner. For this purpose, the outer end of tubular element 17 carries an anti-friction bearing 20" which is fixed against axial displacement by a cam nut 53 holding bearing 20' against an internal shoulder of tubular element 17. The inner race of bearing 20" is fixed against axial displacement on hub 46 by being maintained against an external shoulder thereon by clamping ring 49. Thus, the axial securement of hub 46, as well as that of shaft 23, can be obtained at a single spot and an easily accessible location. Cam nut 53 has a flange 55 extending between the end of tubular element 17 and the flange of hub 46. Thus, by loosening cam nut 53, after removal of wheel disk 56, which latter is secured in the usual manner to the flange 54 of hub 46, and by removing brake drum 58, hub 46, together with shaft 23, can be pulled out from tubular element 17. To interchange shaft 23, it is thereafter only necessary to loosen ring 49 and to back off nut 50 so as to be able to draw out or to press out shaft 23 from hub 46.

The floating bearing arrangement for hub 46 not only provides a particularly simple mounting, but also has other advantages. Thus, all of the anti-friction bearings 20, 20' and 20" used in the drive can be of the same type and size. Furthermore, shaft 23 can be formed for positive driving engagement with the differential, with the chain wheels 21 and 21', and with wheel hub 46, by having identical key ways or other driving formations at the three locations 24, 24' and 24". The interiors of tube elements 11 and 17, and the interior of the housing 7, are isolated from each other by seals 44 and 44'. Thereby, each compartment can be lubricated independently and separately of each other compartment.

As will be clear from FIGS. 3 and 5, the mounting and dismounting of the driving means of the chassis is extremely simple. In this connection, it may be noted, that sleeve 22 and the chain wheels 21 and 21' can be secured to each other by spot welds. Furthermore, the inner diameter of the rings 33 and 34, or 40 and 40', is made larger than the outer diameter of flanges 10 so that these rings can be made in a single piece and nevertheless can be easily removed.

The drive mechanism of the invention not only contributes to the cross country adaptability of the vehicle, but also provides for a greater useful width between the pairs of oscillating arms 8, 8' and 9, 9'. This is further facilitated by the fact that the chassis is made of a series of similar elements which are interchangeable. The mounting and repair of the driving mechanism is so simple that interchanging and exchanging of single parts is possible at any time, whether the vehicle is in the shop or in the field.

The vehicle chassis is subdivided into a front partial frame 59 and rear partial frame 60 (FIG. 2). Frame 59 has its inner end fixedly secured to differential 6, while frame 60 is oscillatably mounted on differential 6 by engaging bearings 61 on the central axle 1.

Figure 7:
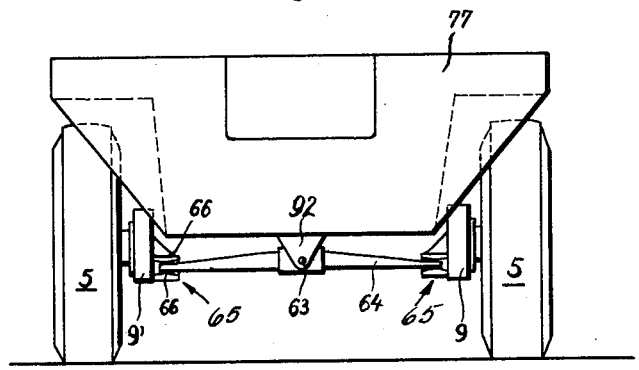
FIG. 7 is a rear elevation view of the vehicle.

Each partial frame includes a pair of adjacent transverse members 62 which serve to support a pivot pin 63 (FIG. 7). These pivot pins oscillatably support leaf springs 64 extending transversely of the vehicle so that these leaf springs are mounted in the manner of a scale or balance beam. Each leaf spring 64 has its ends engaged in abutment bearings 65 which are fixed on the ends of the oscillating arms. As best seen in FIG. 7, each abutment bearing comprises two bearing plates arranged in vertically spaced relation to have the end of a leaf spring 64 extend freely therebetween. The abutment bearings can be provided with linings of rubber, or plastic composition material, or the like, in order to provide a maintenance-free arrangement.

Figure 8:
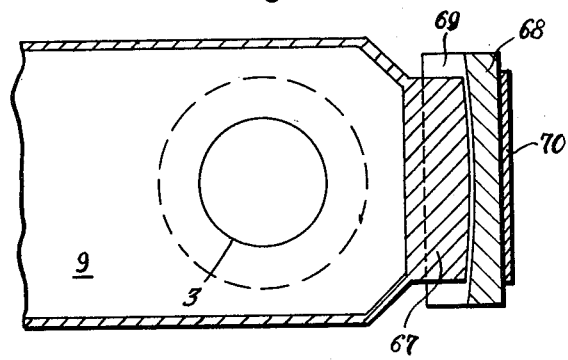
FIG. 8 is a sectional view, taken on the line VIII—VIII of FIG. 9, showing guiding means for an oscillating arm.
Figure 9:
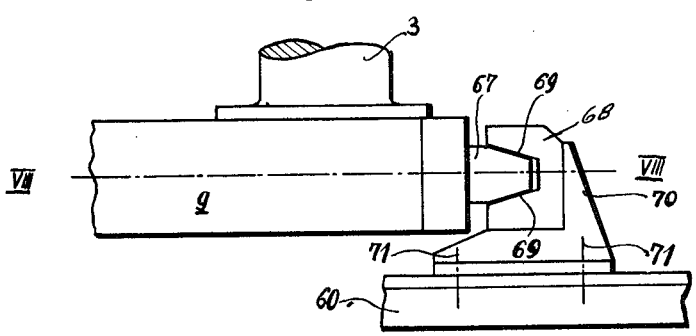
FIG. 9 is a partial plan view illustrating the guiding means of FIG. 8.

Each arm 8, 8' and 9, 9' has its outer end formed with a small rail or rib 67, which is guided by a vertically extending U-profile member 68, each arranged on a partial frame, each rail 67 being positively engaged in a member 68 but vertically slidable relative thereto. Each member 68 has surfaces 69 in diverging facing relation, and against which correspondingly formed surfaces of rail 67 bear. Each rail or rib 67 can thus be welded to the extremity of the associated oscillating arm, or fixed thereto in any suitable manner. Each member 68 is fixed, by means of a support 70 and screws 71, shown by center lines only, on a partial frame 60 or 59. As best seen in FIG. 8, rails 67, as well as members 68, are configured, in a vertical plane, as a circular arc concentric with the central axis 1. Rails 67 can thus oscillate in the vertical direction without any restraint on the associated oscillating arm, while a distortion of the associated oscillating arm is prevented by the bearing surfaces 69.

Figure 10:
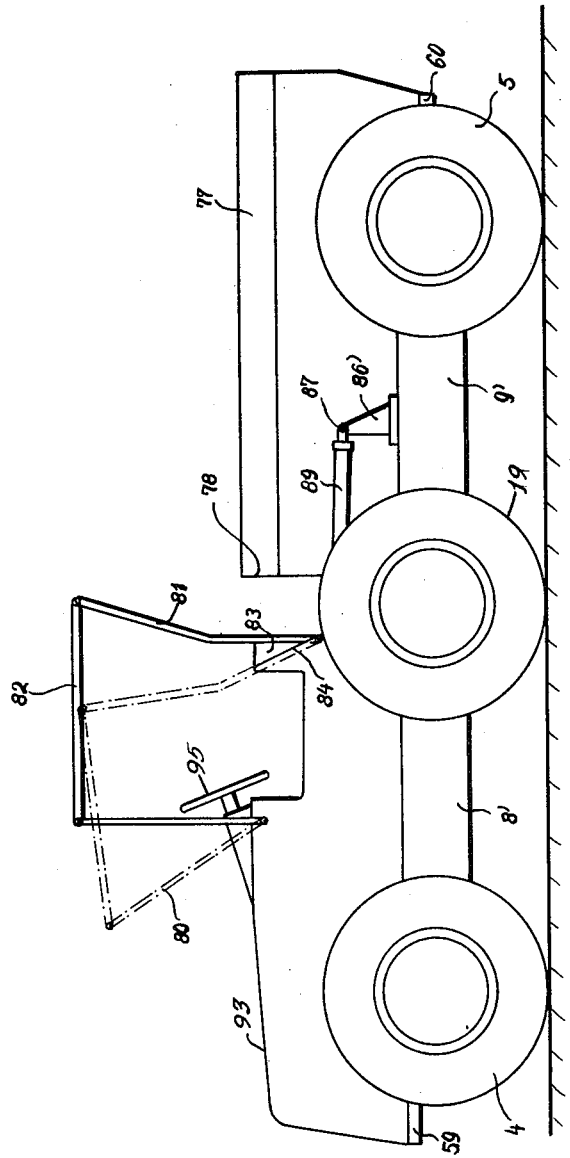
FIG. 10 is a side elevation view of the vehicle illustrating an articulated driver's cab.
Figure 11:
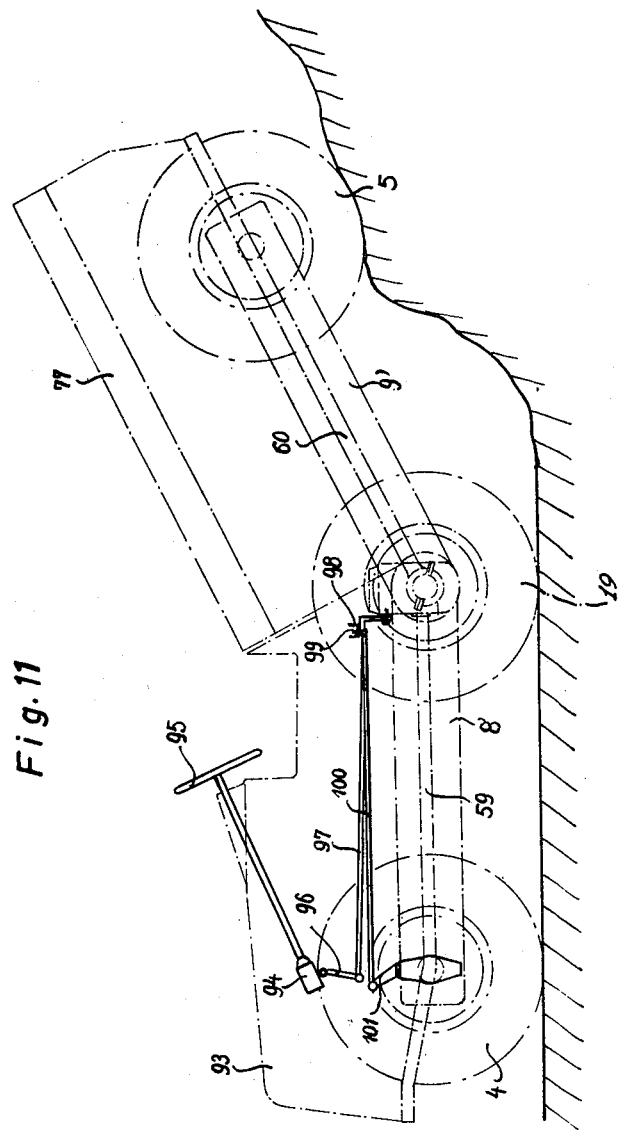
FIG. 11 is a side elevation view of the vehicle, illustrated as operating over uneven terrain, and showing the steering arrangement in solid lines with other parts of the vehicle being shown in dot and dash-lines.

As illustrated schematically in FIG. 6, partial frame 59, which is fixed to central axle 1, supports the drive motor 72 which is connected by means of a clutch 73, a gear mechanism 74 and an articulated shaft 75 in the usual manner to differential 6 on central axle 1. Partial frame 59 further carriers a seat 76 for the vehicle driver, while the other partial frame 60 carries a transporting container 77 which is shown in FIG. 6 in dash and dot lines. If the vehicle is traveling over a flat terrain, as shown in FIG. 10, the seat and the adjacent front wall 78 of container 77 are spaced from each other. As shown in FIG. 6, a back 79 is linked to seat 76 in such a way that it can be swung in a forward direction. As shown in FIG. 10, it is also possible to arrange the seat in a cabin in which front wall 80 and rear wall 81 are articulated to the body of partial frame 59, with roof 82 being connected in an articulated manner with the front and rear walls. For lateral enclosure of the driver's cabin, rear wall 81 can have its base connected by a piece of leather or tarpaulin 83 with the oblique surface 84 of the vehicle body, and the upper part of the cabin can be provided with side walls of canvas or the like.

FIG. 6 illustrates front partial frame 59 raised, as for passing a step or abutment 85 in the terrain. For lifting either frame 59 or frame 60, bearing devices 86 and 86' are fixed on the upper surfaces of the oscillating arms, and the upper end of each bearing device carries a pivot 87. Pivot 87 of the device 86 is connected to a piston rod 88, while a pressure cylinder 89 is connected with pivot 87 of device 86'. Cylinder 89 has ports 90 at each end, so that pressure can be applied to either surface of piston 91. The hydraulic actuator 88–89 is thus double acting and can be used not only for lifting a partial frame 59 or 60 but also for lifting central axle 1. It is also possible to arrange partial frames 59 and 60 and their supported bodies in such a manner, with respect to the weight distribution thereon, that operation of pressure cylinder 89 will always lift partial frame 59. This is generally sufficient, because obstructions encountered are usually encountered when driving in a forward direction. Pivots 87 need not be mounted on the oscillating arms, but may be fixed directly on the body elements.

Due to the individual mounting of the partial frames or swing arms, the movability or articulation of the frames and of the swinging arms is completely unhindered. By this arrangement, not only is it possible to lift frame 59 or frame 60, as well as central axle 1, but each oscillating arm can swing individually, something which is absolutely necessary when one drives over uneven terrain. Such individual movements of the oscillating arms, or of the front and rear wheels mounted at the free ends of these arms, have no influence on partial frames 59 and 60 or on the members mounted thereon. In addition, compensation of the wheel load in a transverse direction is effected by the balance beam-like arrangement of leaf springs 64. In spite of the extraordinary movability of the vehicle and the joints, the motor, the couplings, the transmission and the differential form a relatively fixed unit, so that overload on the drive shaft 75 is completely prevented.

Pivot pins 63 need not be fixed directly on transverse beam 62. As shown in FIG. 7, these pivot pins 63 may be arranged in bearing blocks 92 fixed to the respective partial frame. In any case, securement is effected in such a way that no screws or other fastening means protrude below the lower surfaces of the transverse springs. The holding devices for the transverse springs are preferably in the form of bow-shaped boxes or channels which are flat on their lower surfaces.

By the arrangements so far described, free mobility of the oscillating arms can be maintained on the one hand, and on the other hand the front partial frame forms a unit with the motor and the differential, and this unit is fixed on the central axle. Furthermore, the chassis of the vehicle is protected to a great extent against distortion stresses, even if the terrain results in one front wheel moving upwardly while the other moves downwardly, for example. The driver of the vehicle is not disturbed, when driving over uneven terrain, if either the front wheels or the rear wheels are raised.

Figure 12:
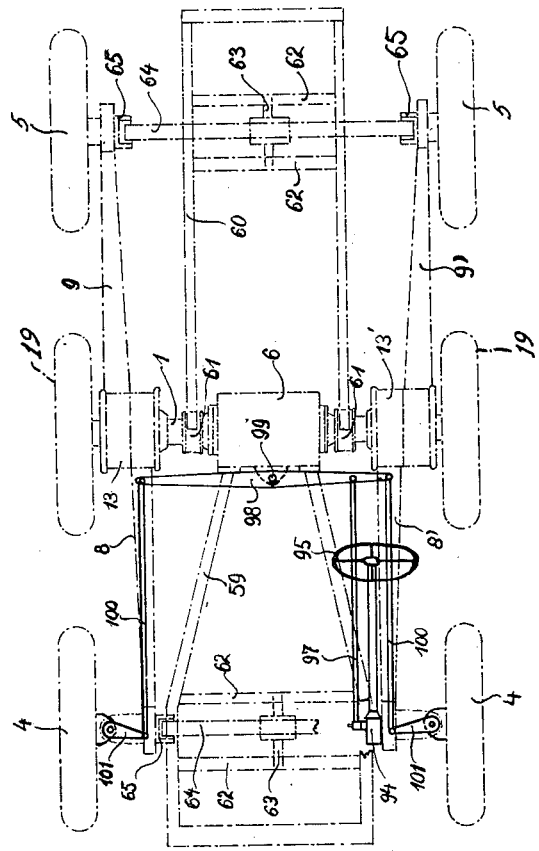
FIG. 12 is a top plan view of the vehicle, corresponding to FIG. 11.

FIGS. 11 through 15 illustrate a steering device which is completely effective even if, due to driving over uneven terrain, a folding of the vehicle or a non-uniform lifting and lowering of the wheels results. As illustrated in these figures, frame 59 fixedly supports a body 93 in which drive motor 72 and driver's seat 76 are contained, while rear partial frame 60 fixedly supports transporting body 77. Front frame 59 supports a steering mechanism 94 which can be operated by means of steering wheel 95. Mechanism 94 includes a steering lever 96 to which is pivotally connected one end of a rod 97 which has its other end connected to one arm of a double-arm steering yoke 98, as best seen in FIG. 12. Yoke 98 is pivotal in a horizontal plane about a vertical pin 99 on differential housing 6. Tie rods 100 connect the free ends of yoke 98 to the steering axle arms 101 of the front wheels. The connections of tie rods 100 and connecting rod 97 to the steering yoke, as well as the connections of rods 100 to the steering axle arms 101, are preferably formed as ball and socket joints. The described arrangement provides for steering of the front wheels without any interference with the cross country running adaptability of the vehicle, or with the action of the front wheels independently of each other.

Figure 13:
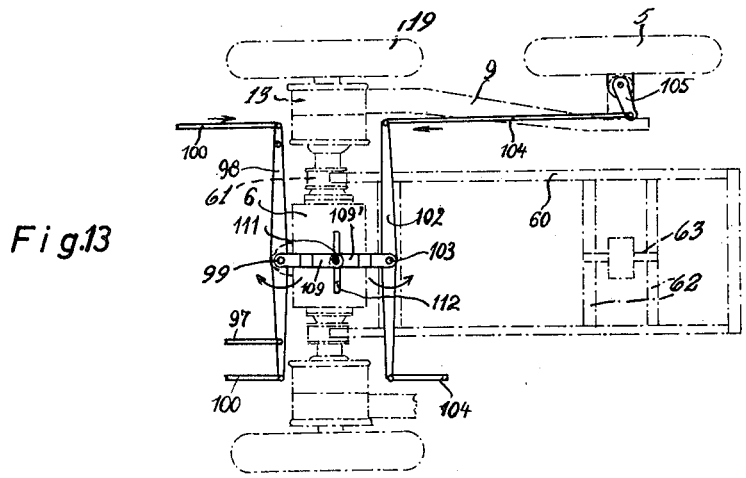
FIG. 13 is a partial top plan view illustrating the vehicle as arranged for steering of the rear wheels.
Figure 14:
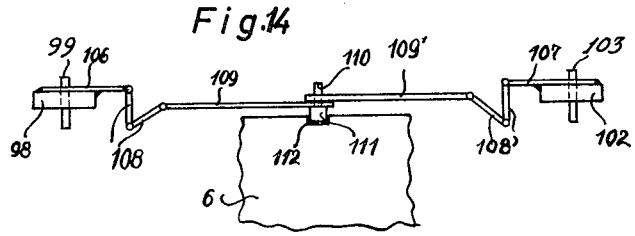
FIG. 14 is a partial elevation view illustrating a detail of FIG. 13.

FIGS. 13 and 14 illustrate an arrangement for steering the rear wheels conjointly with steering of the front wheels. In this arrangement, a second steering element 102 is pivotal in a horizontal plane about a vertically extending pin 103 on differential 60. Tie rods 104 connect the ends of steering yoke 102 to the steering axle arms 105 of rear wheels 5.

As best seen in FIG. 14, an arm 106 extending longitudinally of the vehicle is fixed on front steering yoke 98, and a similar arm 107 is rigidly connected or fixed on the rear steering yoke 102. Knee-type articulation members 108 and 108' connect the ends of arms 106 and 107 to arms 109 and 109', whose inner ends are pivotally interconnected by a vertically extending pivot bolt 110. Bolt 110 has a collar 111 which is guided in a groove 112 formed in differential housing 6 and extending transversely to the driving direction. Arms 106 and 109, conjointly with articulation member 108, form a lever system which is flexible in a vertical direction and changeable in length but which is rigid laterally because articulation member 108 is connected with both arms 106 and 109 by horizontally extending pivots. The same arrangement holds true for the arms 107 and 109' interconnected by articulation member 108'. It is further possible to design arms 109 and 109' so that they are flexible in a vertical direction.

It should furthermore be explained that not only can partial frames 59 and 60 oscillate relative to each other with respect to oscillating arms 8, 8' and 9, 9', but also partial frame 59, by virtue of leaf spring 62, can oscillate relative to front wheels 4 and their steering axle arms 101. If steering wheel 95 is operated to pivot steering yoke 98 in the direction of the curved arrow shown in FIG. 13, a movement in which the springing of the front wheels 4 has no effect whatsoever, the front wheels are turned by tie rods 100 into a position for making a turn toward the left. At the same time, arms 106 and 109 are pivoted clockwise as viewed in FIG. 13, with member 108 compensating for the length variation. The resultant displacement of pivot 110 swings arms 109' and 107 counterclockwise as viewed in FIG. 13. Thus yoke 102 is swung in a counterclockwise direction as indicated by the arrow alongside tie rod 104 in FIG. 13. Rear wheels 5 are thus steered by means of tie rods 104 and axle steering arms 105 into a position for following a curve toward the left. If, during such steering, the vehicle is bent vertically, as shown for example in FIG. 11, the steering of the rear wheels is not affected at all, as articulation element 108' compensates the resulting bending. Thus, there is no unfavorable effect on the steering of the rear wheels 5 if oscillating arms 8' and 9' simultaneously have different relative movements with respect to partial frame 60.

When driving on rough terrain, it sometimes cannot be avoided that, for the purpose of passing dragon teeth barrages or barricades, front partial frame 59 must be lifted. In such a case the vehicle would be without any steering if only the front wheels can be steered. In order to make sure that, in spite of this, the vehicle can be steered, the steering means may be supplemented by a known type of steering brake acting, in each case, on one half of the differential. Such a steering by braking would cause, of course, a lateral sliding of the wheels over the ground, but this is not important when driving over rough terrain.

Figure 15:
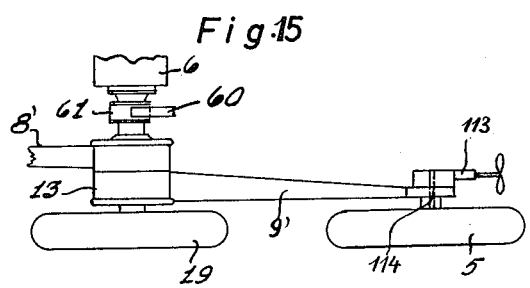
FIG. 15 is a partial plan view illustrating the vehicle as equipped with a propeller for propulsion in water.

FIG. 15 illustrates the vehicle as arranged for propulsion through water, as a floating vehicle. As shown, propellers 113 are mounted on arms 9, 9' and may be driven from driving axles 114 of rear wheels 5. The vehicle body elements 93 and 77 are then made absolutely water tight. The oscillating 8, 9 and 8', 9' likewise can be made water tight so that, in order for the vehicle to float, it will merely be necessary to use inflatable rubber tubes or the like on the body elements 93 and 77, for example.

Thus, it can be seen that the invention provides a novel vehicle which may be employed for either land or water operation. In its broadest aspect the invention includes a central wheeled axle having at least one other forward or rear body portion pivotally mounted with respect to the axle. The central axle advantageously includes cylindrical casings upon which the oscillating arms 8, 8' and 9, 9' are pivotally mounted. The interior of each of the oscillatable arms is advantageously hollowed to permit passage of driving chains which connect driving sprockets on the central axle to driven sprockets in housings located at the ends of the arms for driving the front and rear wheels.

The vehicle is indicated as a six wheel drive vehicle with two wheels on each side of axle 1 which are connected via axle portions to a central differential. The vehicle includes pairs of forward wheels 4, 4 and rear wheels 5, 5 which are supported on the respective oscillatable arms 8, 8' and 9, 9'.

A feature of the invention is that the vehicle may be operated over extremely precipitous terrain by pivoting the frame support arms about the central axle to raise or lower either the forward or rear body portion as desired. As indicated in FIG. 6 the forward body portion is raised by pivoting the arms 8 and 8' about the axle 1 under the control of a fluid pressure system which applies pressure to one end of cylinder 89 to displace a piston rod which is connected to one support arm, with the cylinder being connected to the other support arm. When the vehicle is operating over generally level, but slightly rough, terrain, the forward wheels 4 or the rear wheels 5 may cause the associated frames to raise and lower by acting against the fluid which is in the cylinder 89. During normal operation of the vehicle, the cylinder 89 is not pressurized, so that relative pivotal movements of the arms 8, 8' and 9, 9' may occur.

A further feature of the invention is the unique driving mechanism which includes a central differential driving, on each end, a shaft or axle 23, which carries sprockets for transmitting the driving power to the front and rear wheels. The sprocket housing is supported on the central differential and extends around the axle to enclose the sprockets. The driving chains, which extend around the sprockets, extend through the hollow arms and to the associated front or rear wheels for operation thereof.

A further feature of the invention is the novel steering arrangement which includes means for steering the front wheels and an interconnection with the rear wheels for steering of the rear wheels in those cases where the same is desirable or necessary. Brakes are provided on each of the wheels to permit independent braking of each wheel so that the vehicle can be effectively steered in this manner.

In the embodiment indicated in FIG. 15, the vehicle is also adaptable for marine use and portions are made buoyant, in which event a driving mechanism is arranged to drive a propeller mechanism 113.

While specific embodiments of the invention have been shown and described in detail to illustrate the application of the inventive principles, it will be understood that the invention may be embodied otherwise without departing from such principles.

I claim:

1. An articulated vehicle comprising, in combination, a central through axle extending transversely of the vehicle from one side to the other thereof; a first pair of wheels each secured to one end of said central axle; a pair of relatively elongated front swing arms each pivotally mounted on an end of said central axle adjacent a respective end of the latter and extending forwardly of the vehicle, each of said front swing arms being oscillatable, independently of each other, in a vertical direction; a pair of relatively elongated rear swing arms each pivotally mounted at one end of said central axle adjacent a respective end of the latter and extending rearwardly of the vehicle, each of said swing arms being oscillatable, independently of each other, in a vertical plane; a pair of front wheels each mounted in a respective stub shaft secured to a respective one of said front swing arms; a pair of rear wheels each rotatably mounted on a respective stub axle secured to a respective free end of one of said rear swing arms; said swing arms being of hollow cross section; drive means respectively interconnecting said central axle to each one of said stub shafts, each drive means extending through one of said swing arms; a device for selectively moving one of said pairs of front and rear swing arms vertically relative to the other pair thereof; said pivotal mounting of said pairs of swing arms on said central axle comprising a pair of cylindrical casings mounted on said central axle, one adjacent each end thereof; each front and rear swing arm of each pair of swing arms having an inner end portion embracing a respective part of a corresponding one of said cylindrical casings; the embracing portion of each swing arm comprising a cylindrically arcuate sector-shaped bearing member engaging the associated cylindrical casing and extending through substantially less than one-half the circular periphery of the associated cylindrical casing; and means retaining each sector-shaped bearing member against displacement from the associated cylindrical casing.

2. An articulated vehicle comprising, in combination, a central through driving axle extending transversely of the vehicle from one side to the other thereof; a first pair of wheels each secured to a respective end of said central axle; a pair of cylindrical casings each surrounding said central axle adjacent a respective wheel; means securing each of said casings against rotation relative to the vehicle; said casings rotatably supporting said central axle; a pair of relatively elongated substantially rectilinear hollow front swing arms each having, at one end, bearing means in engagement with a respective one of said casings for pivotal mounting of said front swing arms on said casings, each front swing arm extending forwardly of the vehicle and being oscillatable, independently of the other front swing arm, in a vertical direction; a pair of relatively elongated substantially rectilinear hollow rear swing arms each having, at one end, bearing means engaging a respective one of said casings for pivotal mounting of said rear swing arms on said casings, each rear swing arm extending rearwardly of the vehicle and each being oscillatable, independently of the other, in a vertical plane; a pair of front wheels each mounted in a respective front stub axle, each stub axle being secured to a corresponding free end of a respective one of said front swing arms; a pair of rear wheels each rotatably mounted on a respective rear stub axle secured to a corresponding free end of a respective one of said rear swing arms; a pair of drive sprockets secured to said central axle within each of said casings; drive chain means connecting one drive sprocket of each pair to the associated front stub axle and the other drive sprocket of each pair to the associated rear stub axle, each chain means extending through a pair of arcuately extending apertures in the bearing means of the associated front and rear swing arms and through an arcuately extending and elongated aperture in the associated casing; and a device for selectively moving one of said pairs of front and rear swing arms vertically relative to the other pair thereof; said swing arms constituting the sole means structurally supporting said stub axles for vertical oscillation about said central axle.

3. An articulated vehicle as claimed in claim 2, in which each said bearing means comprises a cylindrical bearing embracing the associated respective one of said cylindrical casings; each cylindrical bearing extending through not more than one-half the axial length of the associated cylindrical casing, and there being a pair of cylindrical bearings engaging each cylindrical casing.

4. An articulated vehicle as claimed in claim 2, including means for steering said front wheels and said rear wheels.

5. An articulated vehicle as claimed in claim 2, including a propeller on the rear end of at least one of said rear swing arms and drivingly connected to the associated rear stub axle.

6. An articulated vehicle, as claimed in claim 2, in which the bearing means of each swing arm comprises a cylindrically arcuate sector-shaped bearing member engaging the associated cylindrical casing and extending through substantially less than one-half the circular periphery of the associated cylindrical casing; and means retaining each sector-shaped bearing member against displacement from the associated cylindrical casing; the front and rear swing arm on each side of the vehicle being in longitudinal alignment with each other.

References Cited in the file of this patent
UNITED STATES PATENTS

| | | |
|---|---|---|
| 2,341,165 | Todd | Feb. 8, 1944 |
| 2,642,144 | Brewer | June 16, 1953 |
| 2,757,373 | Marrie | July 31, 1956 |
| 2,906,358 | Tucker | Sept. 29, 1959 |
| 2,962,176 | Russell | Nov. 29, 1960 |

FOREIGN PATENTS

| | | |
|---|---|---|
| 517,078 | France | Dec. 11, 1920 |
| 359,322 | Italy | May 18, 1938 |